L. WESSELS & J. B. LAU.
REMOVABLE CALK FOR HORSESHOES.
APPLICATION FILED JAN. 18, 1911.

1,006,158.

Patented Oct. 17, 1911.

UNITED STATES PATENT OFFICE.

LOUIS WESSELS AND JOHN B. LAU, OF JERSEY CITY, NEW JERSEY.

REMOVABLE CALK FOR HORSESHOES.

1,006,158.  Specification of Letters Patent.  Patented Oct. 17, 1911.

Application filed January 18, 1911. Serial No. 603,337.

*To all whom it may concern:*

Be it known that we, LOUIS WESSELS and JOHN B. LAU, citizens of the United States of America, and residents of Jersey City, in the county of Hudson and State of New Jersey, have invented certain new and useful Improvements in Removable Calks for Horseshoes, of which the following is a specification.

This invention relates to removable calks for horse-shoes which are applied to the horse-shoes and hoofs during slippery weather so as to give a good foothold to the horses on ice and snow-covered streets, said calks being so applied to the shoe and hoof that they can readily be detached when the horses get back to the stable and applied again when they go out for work; and for this purpose the invention consists of two laterally adjustable calk-plates attached to the underside of the shoe and provided with means for adjusting them to the size of the shoe and hoof, a U-shaped holding bail applied by its bent lower ends to holes of the calk-plates, a chain connecting the rear ends of said U-shaped wire bails and an adjustable chain connected to the front ends of the same, said chain being provided with a locking device for applying the attachment tightly to the shoe and hoof.

The invention consists further of certain details of construction, which will be fully described hereinafter and finally pointed out in the claim.

Figure 1:
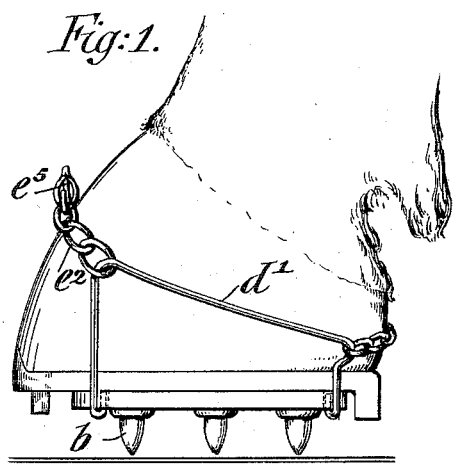
Figure 2:
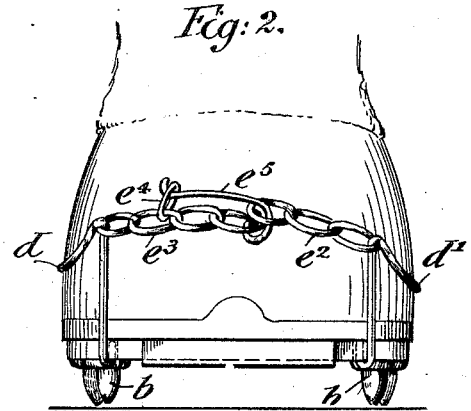
Figure 3:
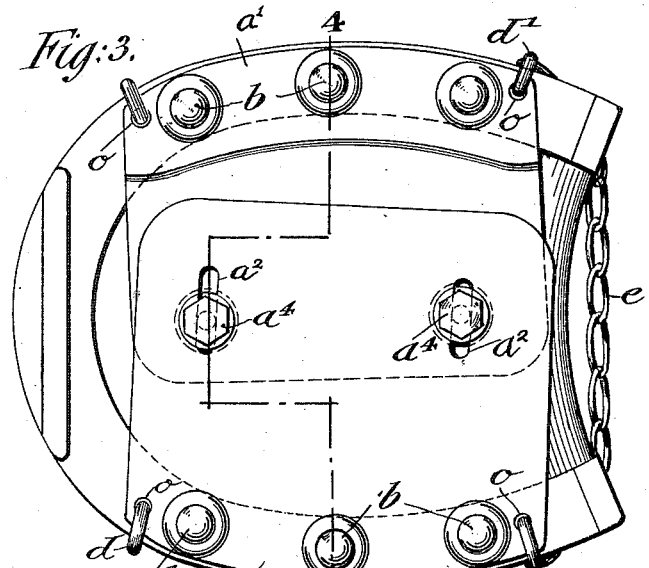
Figure 4:
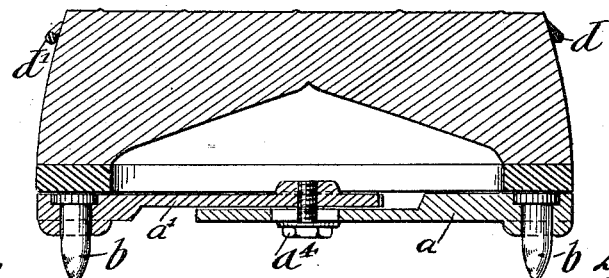

In the accompanying drawings, Figure 1 represents a side-elevation of the hoof and shoe of a horse, showing our improved calk attachment applied thereto, Fig. 2 is a front-elevation of the parts shown in Fig. 1 showing the device for locking the calk attachment to the hoof and shoe, Fig. 3 is a bottom-view of the calk attachment drawn on a larger scale, and Fig. 4 is a vertical transverse section on line 4, 4 Fig. 3.

Similar letters of reference indicate corresponding parts in the different figures of the drawings.

Referring to the drawings, $a$, $a'$, are two removable calk-plates which are made of malleable iron or steel and which extend transversely across the shoe, they being made thicker at their outer portions and provided with sockets for inserting the headed and pointed calks $b$. The inner overlapping thinner end of the calk-plate $a$ is provided with transverse slots $a^2$ through which clamping screws $a^4$ are passed which are firmly screwed into the inner end of the plate $a'$ so as to permit a lateral adjustment of the calk-plates to the smaller or larger size of the horse-shoe. The calks are fitted tightly into socket holes of the thickened rim and the calk-plate so as to be retained in the same by friction and prevented from dropping out when the calk-plates are removed from the shoe. The sockets at each side are arranged on a curved line as shown so as to bring the heads of the calks properly beneath the horseshoe, for bearing thereon. The calk-plates are made of smaller width than the distance between the front and heel calks of the shoe so as to be placed on the shoe between the same, as shown clearly in Figs. 1 and 3. The outer corners of the thicker portions of the calk-plates $a$, $a'$, are provided with holes $o$ into which are inserted the lower inwardly and upwardly bent ends of two wire bails $d$, $d'$, one on each side of the shoe, said bails being approximately of U-shape, but shorter at the rear ends than at the front ends and of lesser height at the rear than at the front ends. The rear ends of the bails $d$, $d'$, are connected by a chain $e$ which extends across the rear portion of the hoof, while the front ends are connected by two chain sections $e^2$, $e^3$, one section being provided with a link $e^4$ passed through one of its links, while the end link is provided with a pivoted locking member $e^5$ of S-shape, which is passed through the end link of the chain section $e^2$ and then through the locking line $e^4$, so as to hold the two chains and hold them in tightly locked position on the front part of the hoof, as shown in Fig. 1.

When the calk-plates are to be attached to the hoof when the streets are slippery and covered with ice and snow, they are first adjusted to the size of the shoe and then tightly clamped together by the clamping screws. They are then passed under the shoe between the front and rear calks and the rear chains passed over the rear portion of the hoof, after which the front chain is passed over the front portion of the hoof and locked in position thereon being passed through the particular link of the chain section $e^2$ that is required for giving a tight fit of the attachment to the shoe and hoof. When the attachment is applied to all the four shoes and hoofs of the horse, it is ready to go out. The tapering pointed calks give the horse a good foothold on the ice or snow-covered streets and prevent accidents arising from the slipping and falling of the horses. When the horse gets back to the stable the locking device is unlocked and the entire attachment removed from the hoof until it is again required when the horse is going out again for work. When one of the calks becomes dull or broken by use, the damaged calk is removed by striking on the same and a new one inserted so that the attachment can be readily applied again.

The calks can be readily applied to shoes and hoofs whenever required by the stableman and removed from the hoofs. The bent-up lower ends of the wire bails are preferably upset so that the bails are not detachable from the calk plates but remain in position thereon so that all the parts are always connected and ready to be applied to the shoe and hoof.

Having thus described our invention, we claim as new and desire to secure by Letters Patent:

A calk-attachment for horse-shoes, comprising two calk-plates of less than horse-shoe length but adjustable to full horse-shoe width, a bolt and slot connection at the forward portion of said plates for laterally adjusting the same relatively to each other, a bolt and slot connection at the rear portion of said plates for laterally adjusting the same relatively to each other, an exterior thickened rim at the outer side of each plate, said rim having a hole in each end, wire bails, one at each side, seated at its lower ends in the holes of the rim and extending upwardly therefrom, sockets extending vertically through the rims, said sockets being arranged in a curved line, and countersunk at their upper portions, removable calks in said sockets, having heads entering the countersunk portions of the sockets, a chain connecting the bails at their rear portions, a chain connecting the bails at their front portions, and an S-link catch in said last-named chain.

In testimony, that we claim the foregoing as our invention, we have signed our names in presence of two subscribing witnesses.

LOUIS WESSELS.
JOHN B. LAU.

Witnesses:
PAUL GOEPEL,
JOHN MURTAGH.

Copies of this patent may be obtained for five cents each, by addressing the "Commissioner of Patents, Washington, D. C."